(12) United States Patent
Pyburn

(10) Patent No.: US 6,434,853 B2
(45) Date of Patent: Aug. 20, 2002

(54) LAP SIDING HANGER

(75) Inventor: John Wayne Pyburn, Jarrell, TX (US)

(73) Assignee: Pitts Construction, Inc., Austin, TX (US)

( * ) Notice: Subject to any disclaimer, the term of this patent is extended or adjusted under 35 U.S.C. 154(b) by 0 days.

(21) Appl. No.: 09/790,471

(22) Filed: Feb. 22, 2001

Related U.S. Application Data

(60) Provisional application No. 60/184,821, filed on Feb. 25, 2000.

(51) Int. Cl.[7] .................................................. G01B 3/30
(52) U.S. Cl. ............................................ 33/647; 33/411
(58) Field of Search ............................. 33/646–649, 42, 33/411, 755, 758, 759, 760, 613

(56) References Cited

U.S. PATENT DOCUMENTS

| | | | | |
|---|---|---|---|---|
| 182,187 A | * | 9/1876 | Green | 33/646 |
| 368,574 A | * | 8/1887 | Eby | 33/647 |
| 429,604 A | * | 6/1890 | Connell | 33/411 |
| 572,582 A | * | 12/1896 | Stevenson | 33/647 |
| 755,758 A | * | 3/1904 | Foust | 33/411 |
| 1,305,996 A | * | 6/1919 | Fairweather | 33/411 |
| 2,157,663 A | * | 5/1939 | Giebink | 33/649 |
| 3,286,351 A | * | 11/1966 | McAlister | 33/42 |
| 4,208,799 A | * | 6/1980 | Frantello | 33/647 |
| 4,314,429 A | * | 2/1982 | Casteel et al. | 52/127.2 |
| 4,425,714 A | * | 1/1984 | Kelly, Jr. | 33/646 |
| 4,459,790 A | * | 7/1984 | Vermillion | 52/764 |
| 4,473,100 A | * | 9/1984 | Wheeler | 81/45 |
| 4,484,392 A | * | 11/1984 | DeFino et al. | 33/647 |
| 4,580,385 A | * | 4/1986 | Field | 52/578 |
| 4,656,744 A | * | 4/1987 | Decker | 33/41.5 |
| 5,295,308 A | * | 3/1994 | Stevens et al. | 33/770 |
| 5,400,519 A | | 3/1995 | Meyer | 33/646 |
| 5,406,711 A | * | 4/1995 | Graham | 33/42 |
| 5,408,757 A | * | 4/1995 | Lenz | 33/647 |
| D362,812 S | | 10/1995 | Meyer | D10/64 |
| 5,522,149 A | | 6/1996 | Meyer | 33/646 |
| 5,937,613 A | * | 8/1999 | Vess, Sr. | 52/749.1 |
| 6,223,443 B1 | * | 5/2001 | Jacobs | 33/27.03 |

* cited by examiner

Primary Examiner—Diego Gutierrez
Assistant Examiner—R. Alexander Smith
(74) Attorney, Agent, or Firm—Booth & Wright, LLP; Matthew J. Booth; Karen S. Wright

(57) ABSTRACT

A siding application tool and a method for installing siding using the tool is described. The tool includes an overlap portion 14 having upper and lower ends, an L-shaped hook portion 10 with an upper bearing surface 12a that forms a generally right-angle hook with the overlap portion, an L-shaped retainer portion 16 with a lower bearing surface 12b that forms a generally right-angle retainer with the overlap portion, and a plate member 18, which may optionally include a slot 20 configured to accept the tongue of a tape measure.

3 Claims, 1 Drawing Sheet

LAP SIDING HANGER

This application claims the benefits of the earlier filed U.S. Provisional Application Serial No. 60/184,821, filed Feb. 25, 2000 (25.02.2000), which is incorporated by reference for all purposes into this specification.

BACKGROUND OF THE INVENTION

1. Field of the Invention

The present invention relates to construction support tools. More specifically, the present invention relates to tools that temporarily support one end of a long piece of siding, enabling a single siding installer to measure and to install long pieces of siding.

2. Description of the Related Art

In the housing industry, teams of two installers generally apply siding to a house or other building. This allows each member of the team to measure the proper overlap of siding and then attach the siding to the side of the home. Generally, the length of the siding prevents one person from performing the job alone. If one person could properly attach the siding, productivity would increase.

While products for permanently attaching wall panels exist, (see, for example, U.S. Pat. No. 4,580,3845, a hooking wall panel clip, and U.S. Pat. No. 4,459,790, curtain wall with cross member pins) there is no temporary, detachable support for attaching siding as simple to construct and to use as the present invention. U.S. Pat. No. 5,400,519 and U.S. Pat. No. 5,522,149 disclose two variations of a siding application and gauge tool, however, proper installation of siding using either of these tools requires several steps and the use of two tools for each piece of siding. The present invention is simpler in construction and use, and an installer who uses the present invention to install siding needs only one tool for a proper installation, as described herein.

SUMMARY OF THE INVENTION

The present invention is a siding application tool that includes an overlap portion having upper and lower ends, an L-shaped hook portion that forms a generally right-angle hook with the upper end of the overlap portion, an L-shaped retainer portion that forms a generally right-angle retainer with the lower end of the overlap portion, and a plate member that extends from the L-shaped retainer portion that is generally perpendicular to the plane of the overlap portion. The L-shaped hook portion includes an upper bearing surface, and the L-shaped retainer portion includes a lower bearing surface. The upper and lower bearing surfaces are generally parallel with the plate member.

The plate member may optionally include a slot configured to accept the tongue of a tape measure, having a long axis that is generally parallel to the length of the tool, and generally perpendicular to the plane of the overlap portion.

DESCRIPTION OF THE DRAWINGS

To further aid in understanding the invention, the attached drawings help illustrate specific features of the following is a brief description of the attached drawings.

DETAILED DESCRIPTION OF THE INVENTION

The present invention is an apparatus and method for a siding installation tool. This disclosure describes numerous specific details that include specific structures, materials, and usage recommendations in order to provide a thorough understanding of the present invention. One skilled in the art will appreciate that one may practice the present invention without these specific details.

The lap siding hanger can be made of any material, however, in a preferred embodiment, the lap siding hanger is formed from 0.050 thick galvanized steel. Galvanized steel is preferred because of its strength and durability, and the accuracy with which products made from galvanized steel can be bent and formed. In the preferred embodiment, the lap siding hanger is made of one piece of material with bends.

Figure 1:
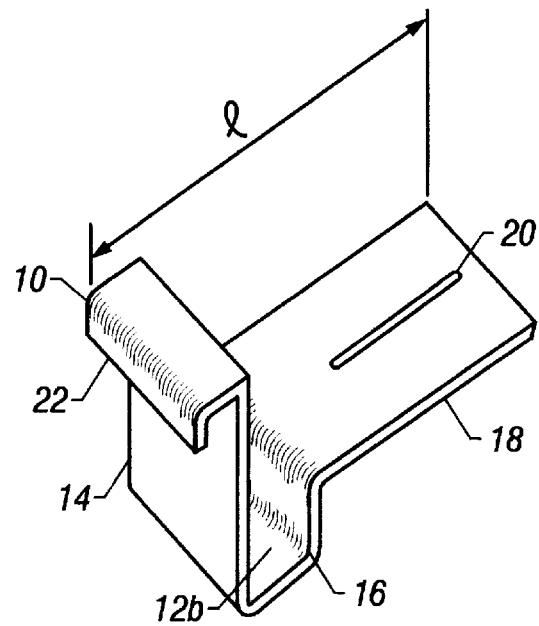
FIG. 1 is a perspective view of the present invention.
Figure 2A:
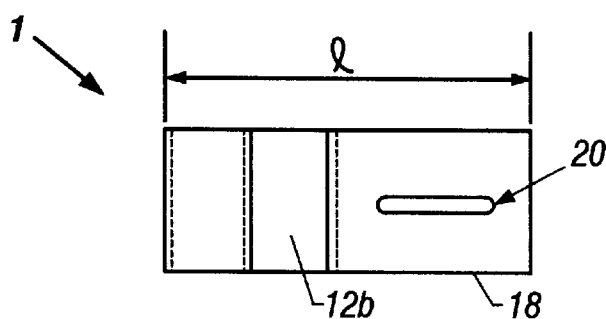
FIGS. 2A and 2B are top and side views, respectively, of the present invention.
Figure 2B:
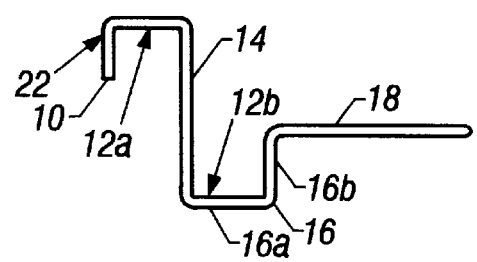

As shown in FIGS. 1 and 2, the lap siding hanger 1 includes an L-shaped hook portion 10 that includes an upper siding bearing surface 12a, a siding overlap portion 14, and an L-shaped retainer portion 16. L-shaped retainer portion 16 includes two legs 16a and 16b. Leg 16a includes lower bearing surface 12b that is generally parallel with upper bearing surface 12a, and leg 16b is generally perpendicular to leg 16a and parallel to overlap portion 14. The lap siding hanger also includes plate member 18 that, in a preferred embodiment, includes a tape measure slot 20. In one embodiment, the surfaces and edges of plate member 18 are covered with a paint, plastic, or other coating that provides a higher-friction, more comfortable gripping surface than galvanized steel.

As shown in FIG. 2, the L-shaped hook portion 10 extends from the upper edge of overlap portion 14 in a substantially perpendicular direction such that upper siding bearing surface 12a is substantially perpendicular to the overlap portion 14, and the overlap portion 14 and L-shaped hook portion 10 together form a generally right-angled hook. L-shaped hook portion also includes a bearing surface 22.

Plate member 18 couples to L-shaped retainer portion such that it is generally parallel to bearing surfaces 12a and 12b and generally perpendicular to the plane of overlap portion 14. Finally, as shown in FIGS. 1 and 2A, the long axis of tape measure slot 20 is generally parallel to the length / of the lap siding hanger 1 and perpendicular to the plane of the overlap gauge 14. Tape measure slot 20 is of sufficient length and width to easily accommodate the tongue of a measuring tape of the general types commonly used in construction and carpentry, but is not so wide or long as to insert unwanted inaccuracy in measurement. In a preferred embodiment, tape measure slot 20 comprises a slot approximately one inch long and 0.1 inch wide.

To install lap siding using the lap siding hanger 1, the installer first draws or pops a chalk line at the height where the first row of siding is to be placed, and then hangs and fastens the first row of siding on the line. The installer then hangs the lap siding hanger 1 over the first installed. piece of siding by sliding the L-shaped hook portion 10 under the top edge of the first piece of siding, such that upper bearing surface 12a rests upon the top edge of the siding. If a measurement is necessary, the installer should hang the lap siding hanger 1 on the first piece of installed siding at the point where the first installed piece of siding overlaps the wall stud nearest the end of the first installed piece of siding, such that the bearing surface 22 of the L-shaped hook portion 10 bears against the subwall over the stud (it there is a subwall) or against the stud if there is no subwall. With the lap siding hanger so placed, the installer can hook a tape measure into tape measure slot 20 and pull the measurement for the next piece of siding. This step can be skipped if a measurement is not necessary.

To hang the next piece of siding, the installer slides the lap siding hanger 1 a few inches past the stud toward the end of the first piece of installed siding, and places the bottom of the next piece of siding in the hanger such that the bottom of the next piece of siding rests upon lower bearing surface 12b and is captured by L-shaped retainer portion 16. The lap siding hanger 1 thus supports the siding while the installer nails the other end and the middle in place. Before fastening the end supported by the lap siding hanger, the installer unhooks the hanger by sliding the hanger upwards to disengage the L-shaped hook portion 10 from the first piece of installed siding. Then, the installer fastens the end of the siding. The installer proceeds by repeating the above procedure for each piece of siding to be installed. Therefore, as this discussion demonstrates, the present invention provides an efficient installation methodology that requires only one siding installer and only one installation support tool.

Those skilled in the art will recognize that the amount of appropriate overlap will vary according to the width of the siding to be installed. Consequently, one practicing the present invention may manufacture and/or use lap siding hangers having varying lengths of overlap portions 14 without departing from the present invention.

In sum, the present invention is a siding application tool and a method for installing siding using the tool. The present invention includes an overlap portion having upper and lower ends, an L-shaped hook portion that forms a generally right-angle hook with the upper end of the overlap portion, an L-shaped retainer portion that forms a generally right-angle retainer with the lower end of the overlap portion, and a plate member that extends from the L-shaped retainer portion that is generally perpendicular to the plane of the overlap portion. The L-shaped hook portion includes an upper bearing surface, and the L-shaped retainer portion includes a lower bearing surface. The upper and lower bearing surfaces are generally parallel with the plate member. The plate member may optionally include a slot configured to accept the tongue of a tape measure, having a long axis that is generally parallel to the length of the tool, and generally perpendicular to the plane of the overlap portion.

Other embodiments of the invention will be apparent to those skilled in the art after considering this specification or practicing the disclosed invention. The specification and examples above are exemplary only, with the true scope of the invention being indicated by the following claims.

I claim the following invention:

1. A siding application tool comprising:

an overlap portion having upper and lower ends;

an L-shaped hook portion extending generally perpendicularly outward and then generally perpendicularly downward from said upper end of said overlap portion, said L-shaped hook portion further comprises an upper bearing surface;

an L-shaped retainer portion having a first leg and a second leg, said first leg couples to said lower end of said overlap portion and extends generally perpendicularly outward from said overlap portion in a direction opposite said L-shaped hook portion, said second leg extends generally perpendicularly upward, said first leg further comprises a lower bearing surface; and a plate member coupled to said second leg of said L-shaped retainer portion, said plate member extends generally perpendicularly away from said second leg of said L-shaped retainer portion, said plate member further includes a slot having a long axis generally perpendicular to the plane of said overlap portion.

2. A method of manufacturing a siding application tool comprising providing an overlap portion having upper and lower ends;

coupling an L-shaped hook portion to said upper end of said overlap portion, said L-shaped hook portion extends generally perpendicularly outward and then generally perpendicularly downward from said upper end of said overlap portion, said L-shaped hook portion further comprises an upper bearing surface;

coupling an L-shaped retainer portion having a first leg and a second leg to said lower end of said overlap portion, said first leg extends generally perpendicularly outward from said overlap portion in a direction opposite said L-shaped hook portion, said second leg extends generally perpendicularly upward, said first leg further comprises a lower bearing surface; and providing a plate member coupled to said second leg of said L-shaped retainer portion, said plate member extends generally perpendicularly away from said second leg of said L-shaped retainer portion, said plate member further includes a slot having a long axis generally perpendicular to the plane of said overlap portion.

3. A method of using a siding application tool, comprising:

providing a siding application tool that comprises an overlap portion having upper and lower ends, an L-shaped hook portion extending generally perpendicularly outward and then generally perpendicularly downward from said upper end of said overlap portion, said L-shaped hook portion further comprises an upper bearing surface, an L-shaped retainer portion having a first leg and a second leg, said first leg couples to said lower end of said overlap portion and extends generally perpendicularly outward from said overlap portion in a direction opposite said L-shaped hook portion, said second leg extends generally perpendicularly upward, said first leg further comprises a lower bearing surface; and a plate member coupled to said second leg of said L-shaped retainer portion, said plate member extends generally perpendicularly away from said second leg of said L-shaped retainer portion, said plate member further comprises a slot having a long axis generally perpendicular to the plane of said overlap portion;

sliding said L-shaped hook portion under the top edge and at a point along the length of an installed piece of siding, such that said upper bearing surface rests upon the top edge of the installed piece of siding and said L-shaped hook portion bears against the stud or against the subwall over the stud nearest the end of the installed piece of siding;

inserting a tape measure into said slot and pulling the measurement for the piece of siding to be installed;

sliding said L-shaped hook portion near the end of the installed piece of siding such that said L-shaped hook portion is positioned under the top edge of the installed piece of siding and said upper bearing surface rests upon the top edge of the installed piece of siding;

placing the bottom of the piece of siding to be installed into said L-shaped retainer portion such that the bottom of the piece of siding to be installed rests upon said lower bearing surface;

securing the free end and the middle of the piece of siding to be installed; and removing said siding application tool and securing the end of the siding to be installed.

* * * * *